R. DACHEUX.
TYPE DISTRIBUTING APPARATUS.
APPLICATION FILED JULY 7, 1909.
958,600.
Patented May 17, 1910.
4 SHEETS—SHEET 1.
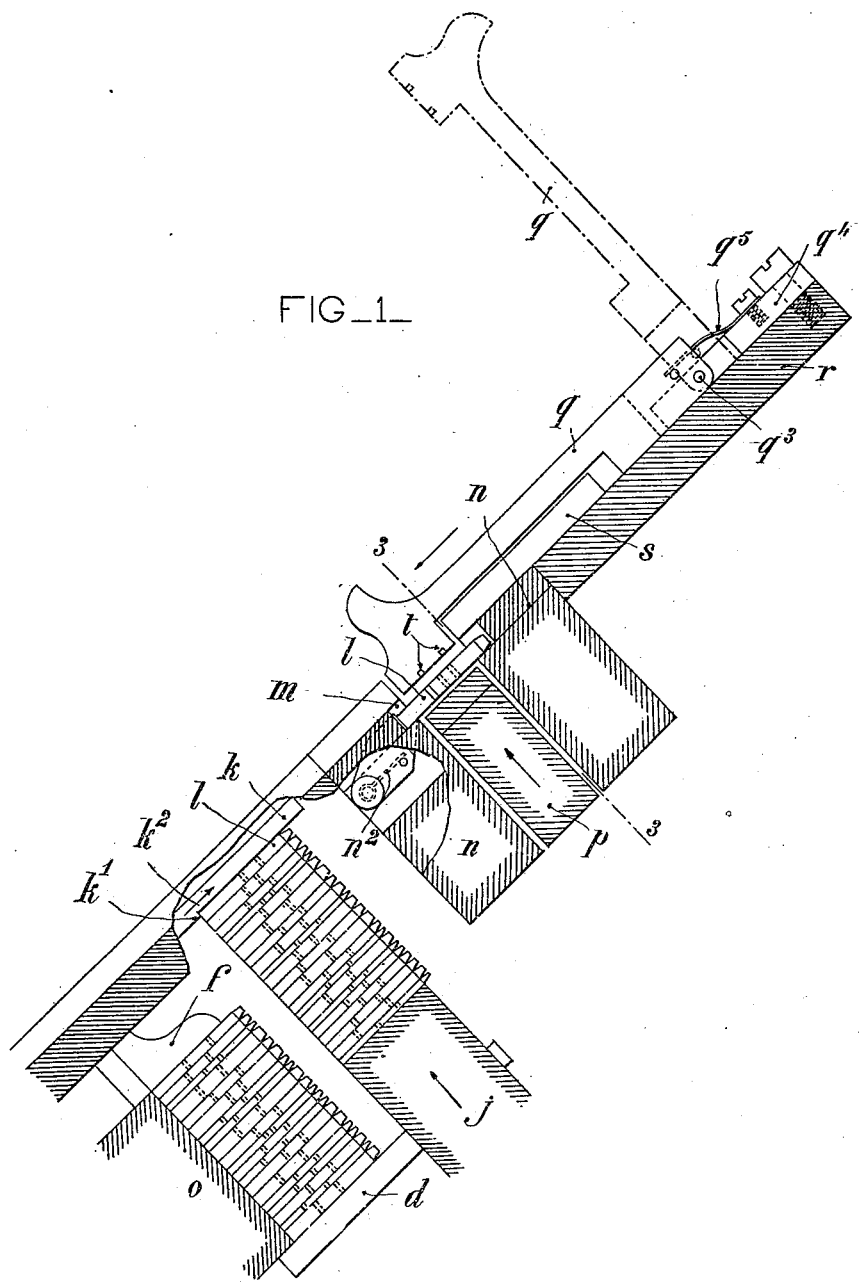

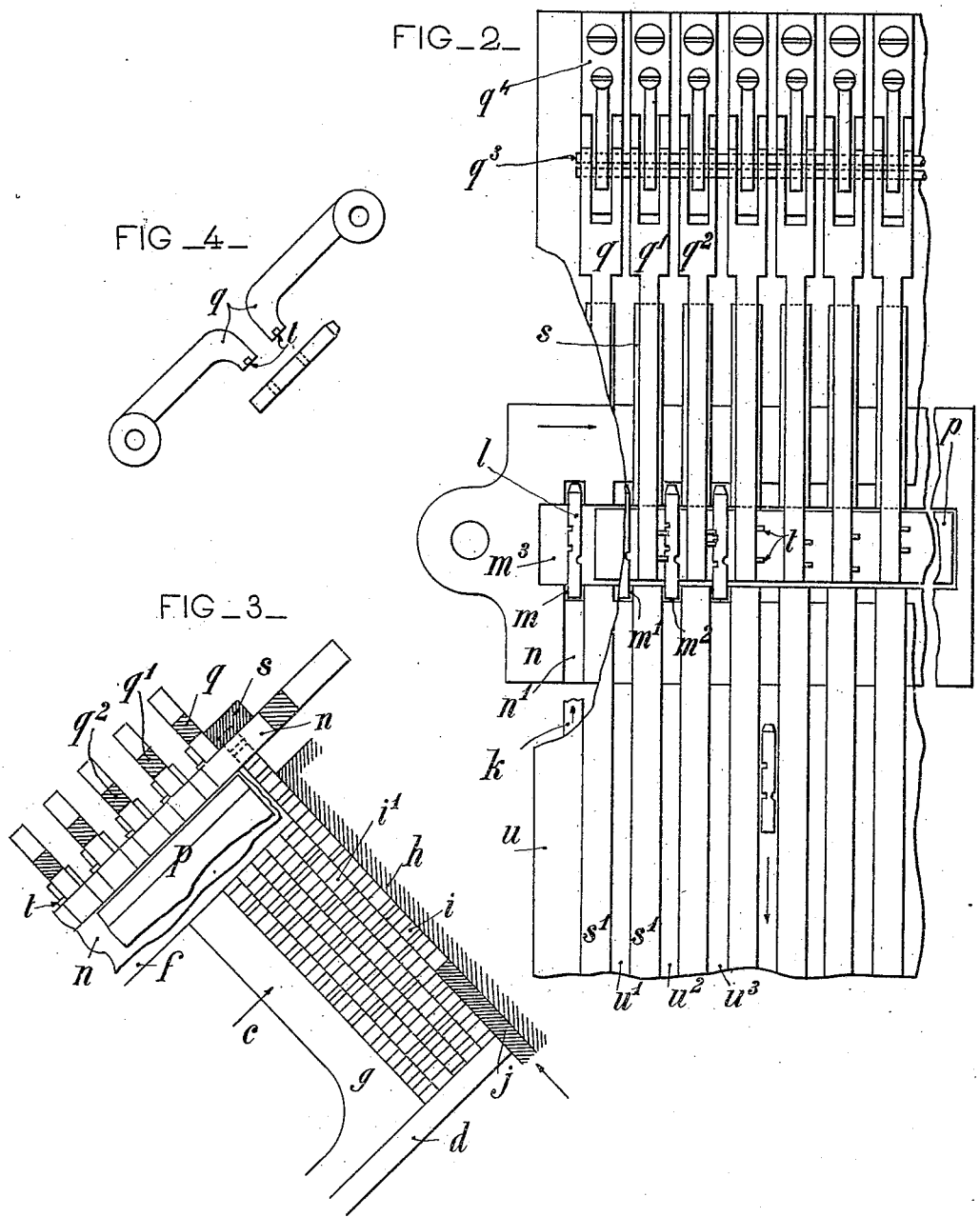

R. DACHEUX.
TYPE DISTRIBUTING APPARATUS.
APPLICATION FILED JULY 7, 1909.
958,600.
Patented May 17, 1910.
4 SHEETS—SHEET 3.
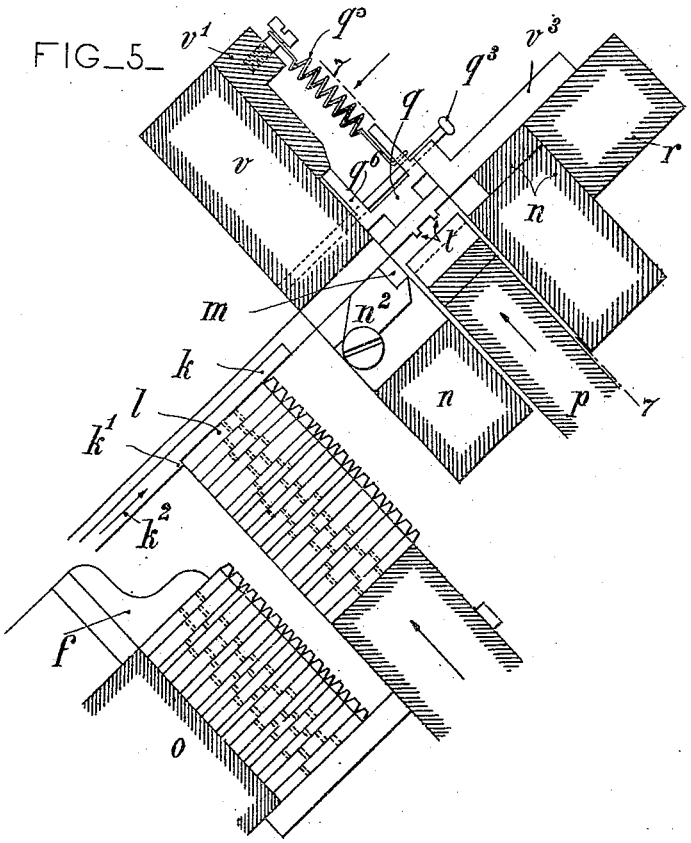
FIG_5_
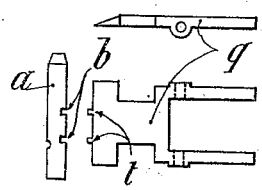
FIG_8_
WITNESSES
W. P. Burke
H. F. Heuman
INVENTOR
René Dacheux
BY Wm Wallace White
ATTY.

R. DACHEUX.
TYPE DISTRIBUTING APPARATUS.
APPLICATION FILED JULY 7, 1909.

958,600.

Patented May 17, 1910.

4 SHEETS—SHEET 4.

WITNESSES
W. P. Burk
A. F. Heuman

INVENTOR
René Dacheux
BY Wm Wallace White
ATTY.

UNITED STATES PATENT OFFICE.

RENÉ DACHEUX, OF LIEGE, BELGIUM.

TYPE-DISTRIBUTING APPARATUS.

958,600.  Specification of Letters Patent.  Patented May 17, 1910.

Application filed July 7, 1909. Serial No. 506,342.

*To all whom it may concern:*

Be it known that I, RENÉ DACHEUX, a citizen of France, residing at 64 Boulevard de Laveleye, Liege, in the Kingdom of Belgium, have invented new and useful Improvements in Type-Distributing Apparatus, of which the following is a specification.

My invention relates to an apparatus for distributing types mechanically to feeding boxes or the magazines of a composing machine, the arrangement being such that the types to be distributed being first laid on a galley are brought individually by a feeding piston into the first of a series of recesses formed in a reciprocating distributing slide and then presented to controllers provided with controlling means or "signatures," said controllers permitting passage of the types when the controlling means or "signature" of the types correspond to the controlling means of the controllers and retaining the types if the "signatures" do not correspond during the return stroke of the distributing slide until the following recess of said slide has come beneath the undistributed type.

For this purpose, the distributing slide is provided with a slot or opening through which a piston ascends for raising the undistributed types and presenting them to the resiliently mounted controllers and retaining said types if not set free by the controllers until the distributing slide has returned to its initial position.

Figure 7:
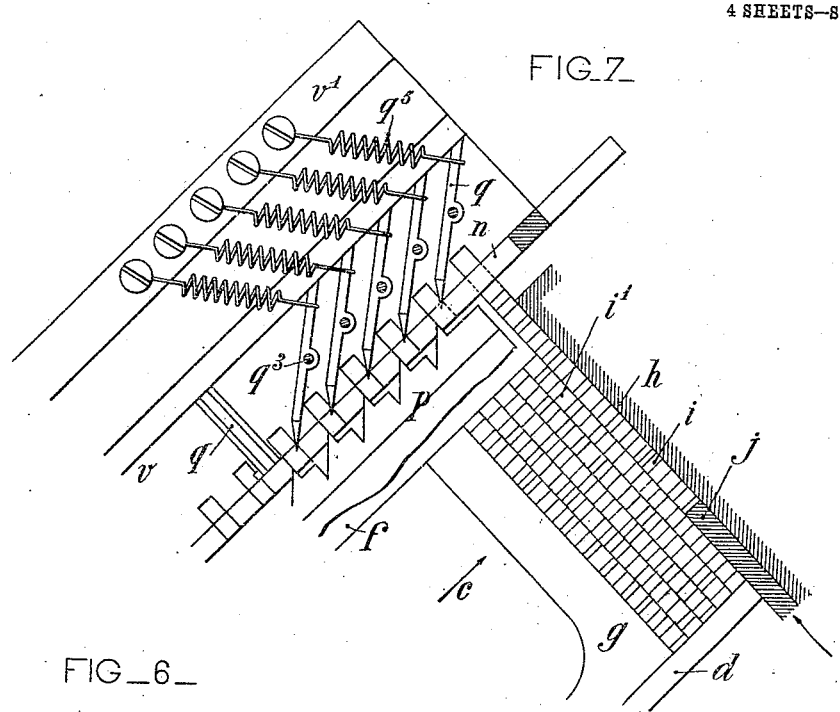
Figure 6:
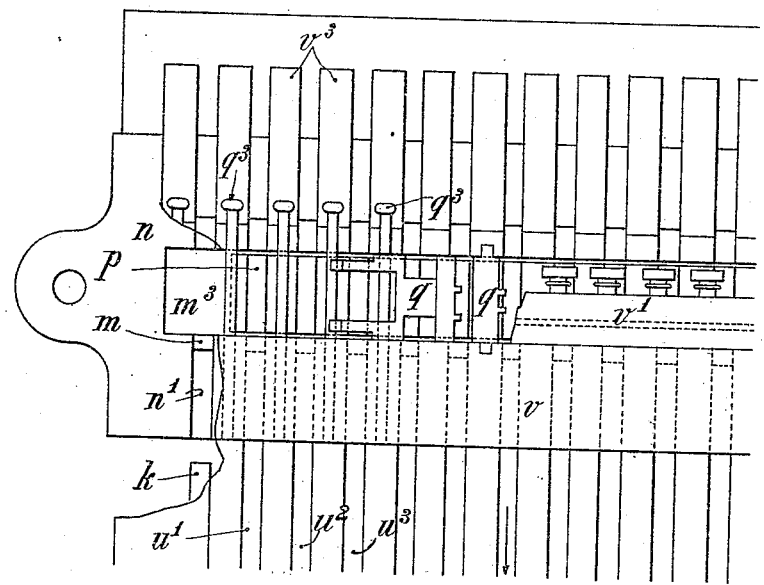

In the annexed drawings which show diagrammatically an embodiment of my invention, Figure 1 is a vertical sectional view of the apparatus, Fig. 2 is a front view, Fig. 3 is a section along the line 3—3 of Fig. 1, Fig. 4 shows a second form of a controller, Fig. 5 is a sectional view showing a third form of a controller. Fig. 6 is a view of the main face of the apparatus showing the third and a fourth form of a controller. Fig. 7 is a view partly in section along the line 7—7 of Fig. 5. Fig. 8 shows a detail of the third form of controllers.

To be distributed mechanically, the characters $a$ must first receive a mark or signature formed of two slots or notches $b$ (Fig. 8) on the opposite side to the usual notch or signature. The different types are differentiated from each other by the distance between the two slots $b$.

My distributing apparatus is used in combination with a feeding device of a known type comprising a galley or inclined table $c$ (Fig. 3) upon which the form of types to be distributed is laid, said types being held laterally by the edge $d$ of this galley and by the wall $f$ which is adjustable according to the length of line or the breadth of the form to be distributed. The lines of types are pushed by a slide $g$ actuated by a weight or a spring toward the fixed wall $h$ closing the extremity of the galley, in the direction of the arrow (Fig. 3). The upper line $i$ is subjected to end pressure by a pusher or slide $j$ drawn by a weight or a spring in the direction of the arrow and brought thereby to a feeding piston $k$ (Fig. 1) having a projection $k^1$ on its lower face. As the feeding piston $k$ is raised (perpendicularly to the drawing and from the rear to the front in Fig. 3) its projection $k^1$ detaches from the line $i$ the first letter $l$ (Fig. 1) and feeds it in the direction of the arrow $k^2$ to a recess $m$ in a distributing slide $n$ which is provided with a passage $n^1$ (Fig. 2) in its upper face for permitting the entrance of the type $l$.

As shown in Fig. 1, the distributing slide $n$ is provided with a spring pawl $n^2$ which is depressed by the entering type but rises behind said type for retaining the same in the recess $m$. As soon as the type $l$ is brought into the distributing slide $n$, the latter moves immediately in the direction of the arrow (Fig. 2) for controlling and distributing the type as hereinafter described while the piston $k$ redescends to take the following type. When the piston $k$ has taken all the characters of the line $i$, a slide $o$ (Fig. 1) brings into the place occupied by the former the line $i'$ which is now at the head of the parcel of type to be distributed. The feeding mechanism just described is actuated by cams keyed on a cam shaft making one revolution each time a new line is to be raised from $i'$ to $i$. In Figs. 3 and 7 the line $i'$ which is located in an inclined plane below that of $i$ is represented as being about to be pushed by $g$ beneath the line $i$.

The distributing mechanism proper, which forms the subject of the present invention, comprises the distributing slide $n$ above referred to which is preferably made of two superposed parts. Said slide is provided with transverse channels or recesses $m$ $m^1$, $m^2$, etc., adapted to receive the types placed flat in said recesses. The slide $n$ has a longitudinally reciprocating motion of an extent equal to the distance between two succeeding recesses. Said slide is slotted longitudinally at $m^3$ to allow passage of the piston $p$ whereby the types are raised at the midpart thereof. The piston $p$ is made of two parts, the upper part being provided with transverse notches or teeth, as shown in Fig. 7 and being secured on the lower part so as to be adjustable lengthwise for the purpose of adjusting the distance between the edges of the notches in the piston and the opposite edges of the recesses in the distributing slide according to the body of the types. This piston $p$ has an upward and downward oblique movement, the stroke being somewhat larger than the depth of the recess in the distributing slide. The slide $n$, the piston $p$ and the feeding piston $k$ are actuated by cams mounted on the same cam shaft.

In the spaces between the recesses or channels $m$ $m^1$ $m^2$, etc., in the distributing slide $n$, are located the heads of the controllers $q$ $q^1$ $q^2$, etc., which are somewhat similar to a gun cock in shape and are pivotally connected by pivots $q^3$ to small brackets $q^4$ mounted side by side on a bar $r$ extending across the machine. The controllers are each provided with a projection or stop limiting their downward stroke and they are normally held in the controlling position in which they extend above bars $s$ which leave between them spaces corresponding to the recesses of the distributing slide $n$. The controllers may however be raised to the position indicated in dotted lines in Fig. 1 to facilitate the inspection and cleaning of the same. Each controller is provided laterally at its lower end, with two small controlling projections or teeth $t$ which form the "signature," the distance between said teeth corresponding to that between the slots of the signature of a determined type. On the face $u$ of the machine, below the controllers and in alinement with the recesses $m$ $m^1$ $m^2$, etc., of the distributing slide, conduits $u^1$ $u^2$, etc., are formed between bars $s^1$, which conduits respectively lead to the boxes or magazine of the composing machine.

The operation of the mechanism is as follows: The piston $k$ feeds a type along the channel $n^1$ into the recess $m$ and retires immediately. Owing to the inclined position of the distributing slide $n$, the type rests by its foot on the lower wall of said recess. Then the distributing slide $n$ moves in the direction of the arrow (Fig. 2) and the recess $m$ comes beneath the space between the two first controllers $q$ $q^1$. At this moment, the piston $p$ is raised through the opening $m^3$ in the distributing slide $n$ and lifts the character which is in the recess $m$. This being done, the slide $n$ returns to initial position and the piston $k$ brings a new type into the first recess $m$. In its upward movement, the piston $p$, as before explained, lifts the character from the recess in the slide and presents the "signature" of the character to the teeth $t$ of the controller $q$. If the "signatures" of the controller and the character correspond, the notches in the letter pass freely upon the teeth of the controller and this latter does not yield upwardly. Having passed the controlling teeth, the type, which is then in front of the conduit $u^1$, is entirely free having been raised by the piston above the walls of the recess, and said type slides into the conduit $u^1$ which leads it to the corresponding box. If, on the contrary, the "signatures" of the controller $q$ and of the character $l$ do not correspond, the controller which bears by its teeth upon the character is lifted by the said character which is held thereby when it arrives opposite the conduit $u^1$ by the elastic pressure exercised thereon by the controller and piston. When the piston $p$ redescends, the undistributed character $l$ redescends therewith but, as the distributing slide has returned to its initial position while the character was held in its raised position, the character is now in the second recess $m^1$ of this slide $n$. During this time, the first recess $m$ has been provided with a new type so that when the slide $n$ is moved again to the right (Fig. 2) the first character $l$ is brought beneath the second space between the controllers $q^1$ $q^2$ and the second character beneath the first space between the controllers. When the piston $p$ is raised again, the first character is presented thereby to the controller $q$ and the second character to the controller $q^1$. If the first character is not yet recognized by the controller $q^1$, i. e. if the signature of said character does not correspond to that of said controller, the first character will redescend with the piston $p$ to enter the third recess $m^2$ of the distributing slide and so on, each type moving step by step and being presented successively to all the controllers until it finds the controller which recognizes it by its signature, that is to say, which corresponds to the "signatures," and permits its passage to the corresponding box. It may be seen from the above description that all types are moved uncovered throughout the apparatus.

Instead of being in one piece, the controllers may be made of two parts $q$ as shown in Fig. 4, each part having its own pivot and one tooth $t$.

A further modified form of controllers is shown in Figs. 5 to 8. In this construction, a bar $v$ is mounted above the distributing slide, said bar having in its lower face transverse slots corresponding to the recesses of the slide and the distributing conduits. In the bar $v$, are secured pivots $q^3$ supporting the controllers $q$ the shape of which is shown in detail in the Fig. 8. The controllers are provided with beveled ends $t$ which replace the teeth above mentioned and bear obliquely upon the type body or the notches thereof when the "signature" of the letter corresponds to the controller. These controllers are normally held down by springs $q^5$ and the shanks $q^6$ thereof abut against a stop $v^1$ in order to limit the downward movement of the beveled ends of the controllers. The shafts or pivots of the controllers, which rest by their free end on bars $v^3$, have a position such that the tips $t$ of said controllers come into engagement with the type at a distance of about three tenths of millimeter only from the edge thereof but rapidly acquire a mid position relative to the body of the type during the ascent of the piston $p$. This arrangement has for effect to prevent the thin types from returning under the pressure of the controllers as happens at present when the controllers work too close to the edges of the types.

The operation is substantially the same as described in connection with the first construction of controllers: The types are lifted by the piston $p$ so that the feet of the types come into the slots $m$ $m^1$, etc., while their heads come between the bars $v^3$. The characters having a "signature" corresponding to the controllers are then able to slide into the conduits $u$, $u^1$, $u^2$, etc., while the undistributed types are returned into the following recesses in the distributing slide $n$ by the elastic pressure of the controllers. The controllers may also be in the shape of small sliding blocks $q$ (Figs. 6 and 7) guided by a groove and tongue engagement in the bar $v$ and the bars $v^3$. The distributing mechanism may also be arranged circularly instead of being along a straight line, the operation remaining the same. The slides instead of bars would then be in a ring shape.

Having now described my invention what I claim as new and desire to secure by Letters Patent is:

1. In a type distributing apparatus, the combination with a feeding mechanism for the types to be distributed, of a distributing slide having recesses adapted to receive the types from the feeding mechanism, controllers provided with a "signature" corresponding to that of the corresponding types, a piston for raising the types from the slide and presenting the same to the controllers, distributing conduits adapted to receive the types recognized by the controllers and means for imparting to the distributing slide and the piston a reciprocating motion.

2. In a type distributing apparatus, the combination with a feeding mechanism for the types to be distributed, of a distributing slide having recesses adapted to receive the types from the feeding mechanism, controllers provided with teeth spaced apart at a distance corresponding to the distance between notches provided in the corresponding types, a piston for raising the types from the slide and presenting them to the controllers, distributing conduits adapted to receive the types recognized by the controllers and means for imparting to the distributing slide and the piston a reciprocating motion.

3. In a type distributing apparatus the combination with a feeding mechanism, of a distributing slide, controlling fingers pivotally mounted at one end, springs for maintaining said controlling fingers in a downward position, a piston for presenting the types to the controllers, distributing conduits, and means for imparting to the distributing slide and the piston a reciprocating motion.

4. In a type distributing apparatus, the combination with a feeding mechanism, of a distributing slide, controlling fingers disposed end to end and pivotally mounted at their opposite ends, a piston for presenting the types to the controllers, distributing conduits, and means for imparting to the distributing slide and the piston a reciprocating motion.

5. In a type distributing apparatus, the combination with a feeding mechanism, of a distributing slide, controlling fingers pivotally mounted intermediate their ends, springs for maintaining the operating ends of the controllers in a downward position, a stop coacting with the shanks of the controllers for limiting the downward movement thereof, a piston for presenting the types to the controllers, distributing conduits, and means for imparting to the distributing slide and the piston a reciprocating motion.

6. In a type distributing apparatus, the combination with a feeding mechanism, of a distributing slide, controllers, a piston for presenting the types to said controllers, said piston comprising a notched upper part adjustable lengthwise on the lower part, distributing conduits and means for imparting to the distributing slide and the piston a reciprocating motion.

In testimony whereof I have signed my name to this specification in the presence of two subscribing witnesses.

RENÉ DACHEUX.

Witnesses:
 HENRI MALET,
 MAURICE HERMITTE.